(12) United States Patent
Benzel et al.

(10) Patent No.: US 8,759,136 B2
(45) Date of Patent: Jun. 24, 2014

(54) METHOD FOR CREATING MONOCRYSTALLINE PIEZORESISTORS

(75) Inventors: Hubert Benzel, Pliezhausen (DE); Heribert Weber, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/431,399

(22) Filed: Mar. 27, 2012

(65) Prior Publication Data

US 2012/0248552 A1   Oct. 4, 2012

(30) Foreign Application Priority Data

Mar. 29, 2011 (DE) .......... 10 2011 006 332

(51) Int. Cl.
*H01L 29/84* (2006.01)
(52) U.S. Cl.
USPC .............. 438/50; 257/415; 257/E27.006
(58) Field of Classification Search
USPC ................. 257/415, E27.006; 438/50
See application file for complete search history.

(56) References Cited

U.S. PATENT DOCUMENTS

| | | | |
|---|---|---|---|
| 3,902,926 A | 9/1975 | Perloff et al. | |
| 4,498,229 A | 2/1985 | Wilner | |
| 6,225,140 B1 * | 5/2001 | Liu et al. ............ | 438/48 |
| 7,354,786 B2 | 4/2008 | Benzel et al. | |
| 7,494,839 B2 | 2/2009 | Benzel et al. | |

FOREIGN PATENT DOCUMENTS

| | | |
|---|---|---|
| DE | 26 44 638 | 4/1977 |
| DE | 33 35 772 | 4/1984 |
| DE | 10 2005 031 604 | 1/2007 |
| DE | 10 2006 024 668 | 11/2007 |
| DE | 10 2008 002 332 | 12/2009 |
| DE | 10 2008 043 084 | 4/2010 |
| EP | 0 005 728 | 12/1979 |
| EP | 1 087 445 | 3/2001 |

* cited by examiner

*Primary Examiner* — Jami M Valentine
(74) *Attorney, Agent, or Firm* — Kenyon & Kenyon LLP

(57) ABSTRACT

An electrically insulating sheathing for a piezoresistor and a semiconductor material are provided such that the piezoresistor is able to be used in the high temperature range, e.g., for measurements at higher ambient temperatures than 200° C. A doped resistance area is initially laterally delineated by at least one circumferential essentially vertical trench and is undercut by etching over the entire area. An electrically insulating layer is then created on the wall of the trench and the undercut area, so that the resistance area is electrically insulated from the adjacent semiconductor material by the electrically insulating layer.

18 Claims, 8 Drawing Sheets

METHOD FOR CREATING MONOCRYSTALLINE PIEZORESISTORS

BACKGROUND OF THE INVENTION

1. Field of the Invention

The present invention relates to a method for creating monocrystalline piezoresistors in the surface of a semiconductor substrate, in which at least one dopant is introduced into the resistance area and in which the resistance area is provided with an electrically insulating sheathing.

2. Description of Related Art

It is known that monocrystalline piezoresistors may be created in a monocrystalline silicon layer by doping the resistance area. Such monocrystalline piezoresistors have a high sensitivity to mechanical stress and also have long-term stability. These piezoresistors are therefore used for signal detection in a number of micromechanical sensor elements, for example, acceleration, force or pressure sensor elements.

In a temperature range below 160° C., piezoresistors in monocrystalline silicon are electrically insulated already just by the depletion zone of the pn-junction between the resistance area and the surrounding silicon. However, with an increase in the ambient temperature, leakage currents occur at this pn-junction. Such piezoresistors are therefore used for measuring purposes only up to an ambient temperature of approximately 160° C. to a maximum of 200° C. At higher temperatures, the leakage currents occurring at the pn-junction lead to an unacceptable distortion of the measurement results.

Published German patent application document DE 10 2008 043 084 A1 proposes embedding the piezoresistor in an oxide area in order to reliably insulate a monocrystalline piezoresistor electrically from the adjacent silicon material, even at higher ambient temperatures. According to published German patent application document DE 10 2008 043 084 A1, the silicon environment of the piezoresistor is therefore initially etched to make it porous, and then the porous etched silicon material is oxidized.

BRIEF SUMMARY OF THE INVENTION

Alternative possibilities for creating an electrically insulating sheathing for a piezoresistor in a semiconductor material are proposed with the present invention, so that such a piezoresistor may also be used in the high-temperature range, i.e., for measurements at ambient temperatures higher than 200° C.

According to the present invention, the resistance area is initially delineated laterally by at least one circumferential, essentially vertical trench and then undercut by etching over the entire area. Next an electrically insulating layer is created on the wall of the trench and the undercut area, so that this electrically insulating layer is electrically insulated from the adjacent semiconductor material.

In contrast with the method described in published German patent application document DE 10 2008 043 084 A1, the method according to the present invention may be applied to different semiconductor materials and is not limited to monocrystalline silicon. Thus not only monocrystalline piezoresistors may be created and electrically insulated in a monocrystalline silicon layer but also piezoresistors may be created in other semiconductor materials. Materials other than silicon oxide are also used in particular for implementation of a thermally stable electrical insulation of the piezoresistors. As in the case of published German patent application document DE 10 2008 043 084 A1, the insulating layer surrounding the piezoresistor is created exclusively with the aid of standard surface micromechanical methods, which are readily controllable, according to the present invention.

The electrically insulating layer should sheath the piezoresistor as thoroughly as possible, at least on the substrate side, to ensure that even at higher temperatures, leakage currents do not occur at any point between the piezoresistor and the adjacent semiconductor material. The resistance area must therefore be undercut by etching throughout the entire area. The etching attack required for this purpose is advantageously performed over the vertical trench delineating the resistance area laterally. The resistance area is then undercut by etching in an isotropic etching step in which the base area of the trench is widened. This variant of the method results in completely undercutting the resistance area only if the lateral extent of the resistance area is small enough in relation to the isotropic widening of the trench.

Otherwise it is advisable to also create trench openings within the cohesive resistance area, these openings extending to beneath the resistance area. These trench openings are then widened in the base area in an isotropic etching step together with the circumferential trench, so that the resistance area is undercut by etching starting from the edge area and also in the central area at the same time.

In the method according to the present invention, it is important to be sure that the resistance area remains mechanically connected to the semiconductor substrate despite the circumferential trench and complete undercutting. The mechanical connection may be implemented at points in the form of webs, for example, between the resistance area and the surrounding semiconductor substrate. In this case, the webs should be formed from an electrically insulating material if at all possible.

In a preferred variant of the method according to the present invention, the mechanical connection of the resistance area is ensured with the aid of the trench mask. The trench mask is therefore not opened completely in the area of the circumferential trench to be created but instead is merely provided with perforations through which the etching attack of the trench process takes place. The distance and size of the perforation openings here are selected in such a way that the perforation area of the trench mask is completely undercut by etching during the trench process. In this procedure, the resistance area is held by the trench mask until it is again bound to the semiconductor substrate by the electrically insulating layer created on the wall of the trench and the undercut area. Therefore, in this case, no additional measures are necessary for electrical insulation of the mechanical connection of the resistance area in this case. An oxide layer is preferably created on the substrate surface as the trench mask, which is easily structured accordingly.

As already mentioned, the trench and the undercut area may essentially be coated with any electrically insulating material to electrically insulate the resistance area, for example, coating it with silicon nitride or silicon carbide. An oxide layer is preferably created on the wall of the trench and the undercut area because standard methods such as thermal oxidation and/or CVD (chemical vapor deposition) methods may be used for this.

In most cases, the trench and the trench openings, if necessary, are filled at least to the extent that a closed planar surface is formed. In the simplest case, this may be continued for coating the wall of the trench and the undercut area until the trench and the trench openings are sealed with the coating material, at least superficially.

In the case of a larger opening area of the trench and the trench openings, a first oxide layer may also be created initially in the area of the trench, the trench openings, if necessary, and the undercut area and then a polysilicon layer being deposited thereon which is subsequently oxidized in an additional method step.

Within the context of the manufacturing method according to the present invention, the substrate surface is usually also coated with the electrically insulating material with which the piezoresistor is sheathed on the substrate side. Therefore, not only the piezoresistor but also the entire substrate surface is protected very well from environmental influences. For contacting the piezoresistor, terminal pads may then be formed easily in a metal layer which extends over corresponding contact openings in this passivation layer of electrically insulating material. With regard to a particularly good media resistance, it has proven advantageous if the terminal pads are formed from a noble metal such as platinum or gold. This also prevents Kirkendall voiding in particular, which occurs at the connection of aluminum pads to gold bond wires at higher temperatures.

In a particularly advantageous layout variant, in which a resistance area is provided with two metal contacts on opposite end sections of the resistance area, these end sections are designed to be wider than the central area of the resistance area, to better transmit any mechanical stresses in the area of the piezoresistor and in particular the connecting area to the adjacent semiconductor substrate.

The method according to the present invention is based initially only on the formation of an electrical insulation between a monocrystalline piezoresistor, which has been created in the surface of a semiconductor substrate, and the adjacent semiconductor material. Depending on the function of the component equipped with such a piezoresistor, additional layers are created on this monocrystalline layer and processed.

A preferred field of application for monocrystalline piezoresistors is the detection of mechanical stresses in a micromechanical component structure, for example, in the diaphragm of pressure sensors and microphones or in bending beams of an acceleration sensor, a balance and a force sensor or a torsion sensor. Since the piezoresistors according to the present invention are created in the substrate surface, they are on the diaphragm surface or on the surface of the bending beam and are thus at the greatest possible distance from the neutral fiber of the micromechanical measurement structure. This contributes significantly toward an increase in measurement sensitivity. Signal detection in the case of yaw-rate sensors or actuators, for example, micromirrors, may also be mentioned here as possible applications.

DETAILED DESCRIPTION OF THE INVENTION

Figure 1A:
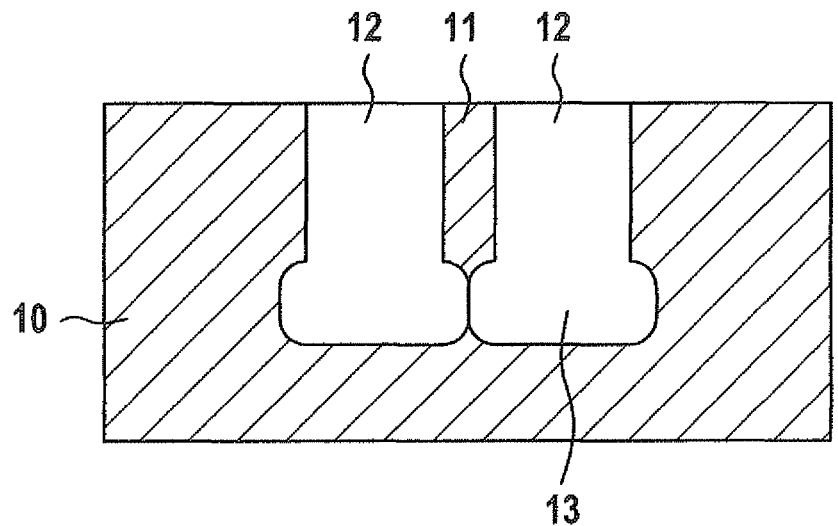
FIGS. 1a through 1d show a schematic sectional diagram through a substrate 10 according to individual method steps of a first variant of the method according to the present invention for creating a piezoresistor.

FIGS. 1a through 1d illustrate a method for creating piezoresistors in the surface of a semiconductor substrate 10, which is preferably monocrystalline, so that the piezoresistors are also monocrystalline. Semiconductor substrate 10 may be a silicon wafer, for example, having any basic doping. In the simplest case, this substrate doping forms the doping of resistance area 11. If resistance area 11 is to be provided with another doping, the entire substrate surface may be doped accordingly. Structured doping is not absolutely necessary because resistance area 11 is electrically insulated from the adjacent substrate material on all sides with the aid of the method according to the present invention. For this purpose, an essentially vertical circumferential trench 12 around resistance area 11 is initially introduced into the substrate surface, which laterally delineates resistance area 11 and extends to the depth of resistance area 11. Base area 13 of this trench 12 is then widened in an isotropic etching step until resistance area 11 is completely undercut by etching, so that resistance area 11 is still connected mechanically to semiconductor substrate 10 only at points, for example, by webs. FIG. 1a shows semiconductor substrate 10 after the etching mask, which is necessary for the trench process and the isotropic etching step, has been removed. The mechanical connection of resistance area 11 to semiconductor substrate 10 is not shown here.

Figure 1B:
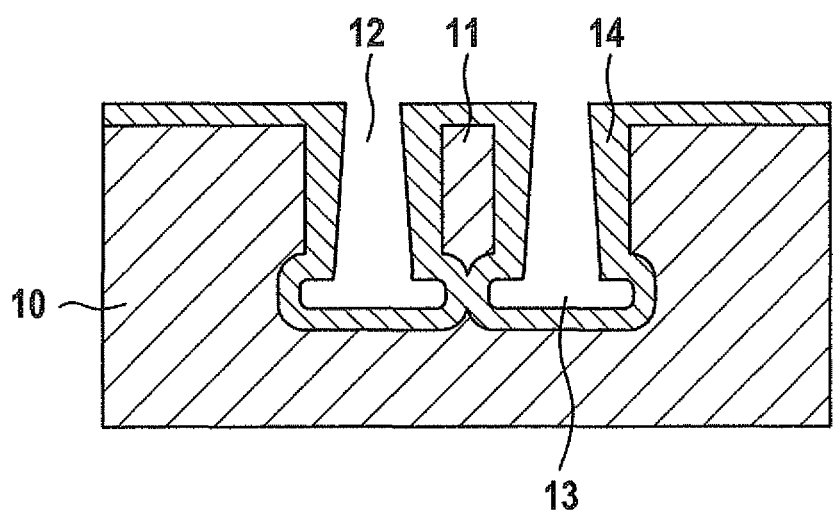
Figure 1C:
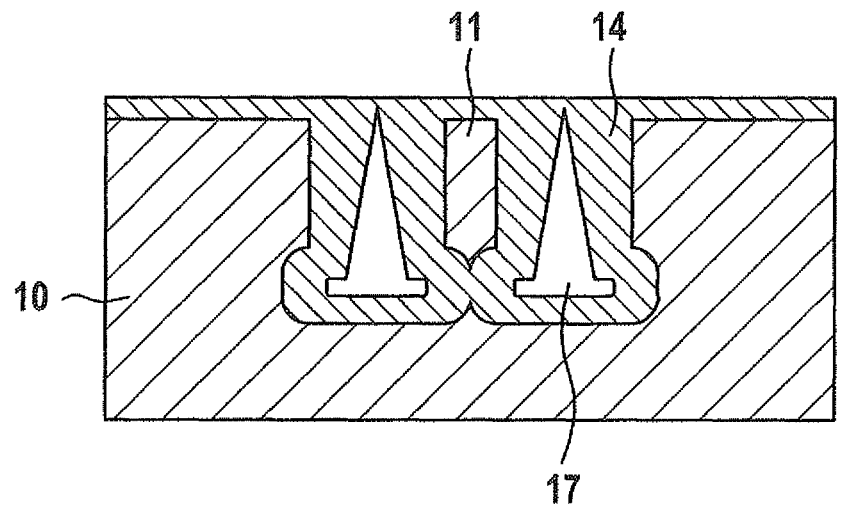

The substrate surface and the wall of trench 12 and of undercut area 13 are then provided with an electrically insulating layer 14, as shown in FIG. 1b. In the exemplary embodiment depicted here, electrically insulating layer 14 is an oxide layer created by thermal oxidation. The thermal oxidation process is continued until trench 12 is closed at least at the surface, as shown in FIG. 1c. As a result of this self-stopping oxidation process, resistance area 11 is completely surrounded by an electrically insulating material. In the present exemplary embodiment, a residual cavity 17 remains beneath the closed substrate surface laterally from resistance area 11 due to the geometry of trench 12.

Figure 1D:
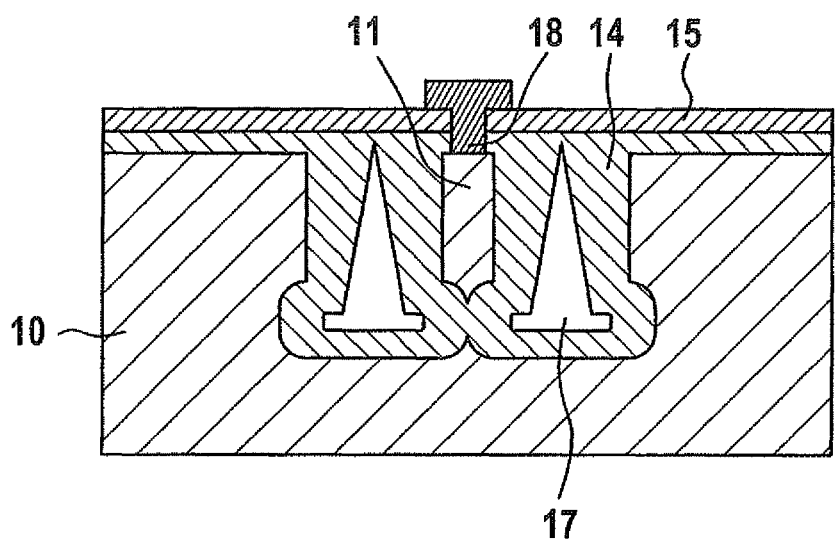

FIG. 1d shows semiconductor substrate 10 having piezoresistor 11 which was created in this way and has been provided with metal contacts 18. For this purpose, oxide layer 14 was opened in the area of piezoresistor 11. The corresponding contact holes were defined here with the aid of a passivation layer 15 in a photolithographic process and were then etched by a wet chemical method. However, they may also be opened by plasma etching. Aluminum metallization, for example, was then applied, and metal contacts 18 were then structured out of the metallization. However, metal contacts of a noble metal, for example, Pt or Au, are to be preferred from the standpoint of achieving a particularly good media resistance of the piezoresistor.

FIGS. 2a through 2d illustrate one variant of the method described above, in which the mechanical bonding of resistance area 21 is accomplished with the aid of trench mask 26.

Figure 2A:
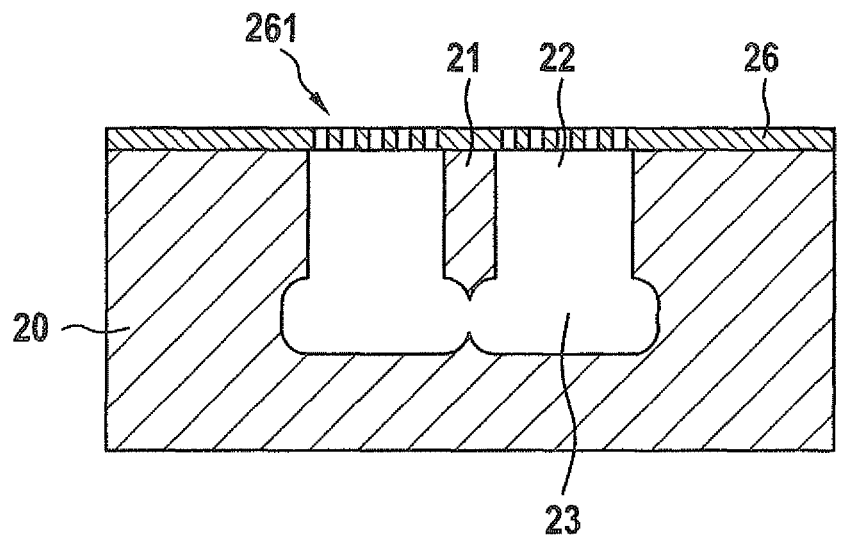
FIGS. 2a through 2d each show a schematic sectional diagram through a substrate 20 according to individual method steps of a second method variant.

This method variant also begins with a monocrystalline silicon substrate 20. To create an essentially vertical trench 22 which laterally delineates resistance area 21, the substrate surface was initially masked with an oxide layer 26, which was provided with a perforation 261 in the area of trench 22 to be created. Accordingly, the etching attack of the trench process and also of the subsequent isotropic etching step for undercutting of resistance area 21 takes place through perforation 261 in oxide layer 26. The distance and size of the perforation openings were selected in such a way that a cohesive trench 22 surrounding resistance area 21 in the form of a ring is created during the trench process. FIG. 2a shows silicon substrate 20 with the essentially vertical trench 22, whose base area 23 has been widened to the extent that resistance area 21 is completely undercut by etching.

Figure 2B:
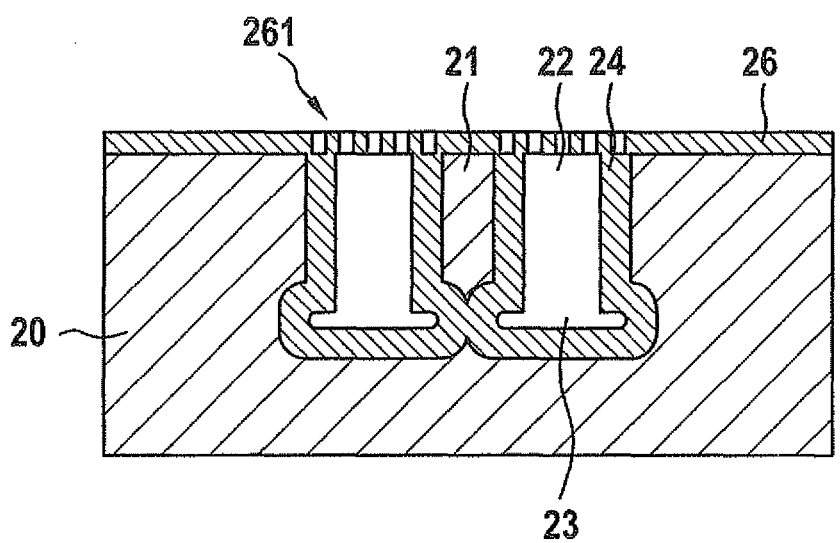

In contrast with the method variant described above in conjunction with FIGS. 1a through 1d, trench mask 26 is not removed here but remains on the substrate surface even during the subsequent oxidation process, as illustrated in FIG. 2b.

FIG. 2b shows structured silicon substrate 20 after the wall of trench 22 and undercut area 23 have been provided with a first oxide layer 24 for electrical insulation of resistance area 21.

Figure 2C:
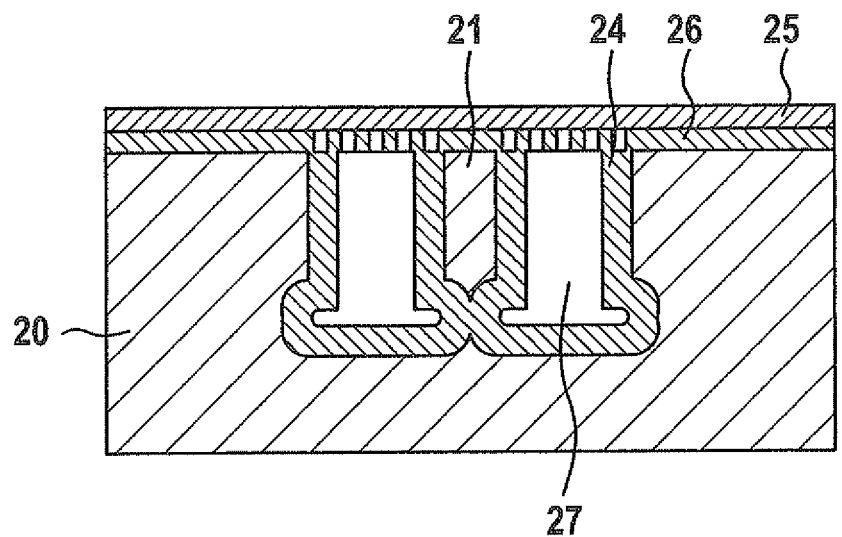

As shown in FIG. 2c, perforation 261 in trench mask 26 is closed only then by applying another passivation 25. This may be, for example, a nitride layer, which is deposited on the surface of the component in a CVD method.

Figure 2D:
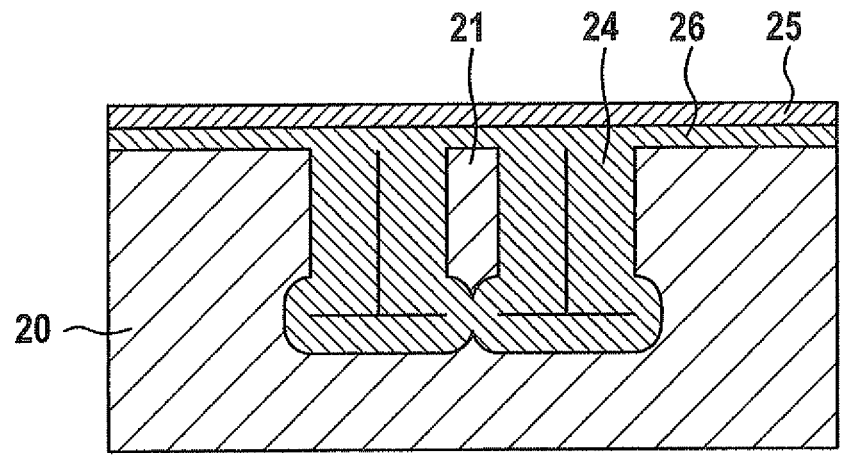

Cavity 27 in the area of trench 22, 23 of this encapsulated structure is then filled by thermal oxidation in a second oxidation step. FIG. 2d shows that the process of thermal oxidation in the present exemplary embodiment was continued until cavity 27 was completely oxidized. Since this method step usually also affects the extent and location of the perforation openings in trench mask 26, a discussion of the perforation has been omitted here.

Figure 3A:
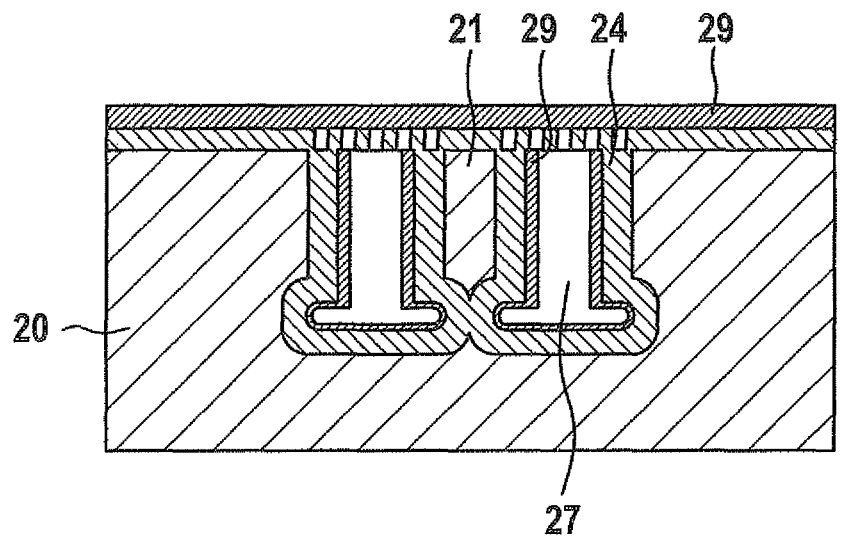
FIGS. 3a, 3b illustrate a method variant for filling the trenches on the basis of schematic sectional diagrams through the structured substrate 20.
Figure 3B:
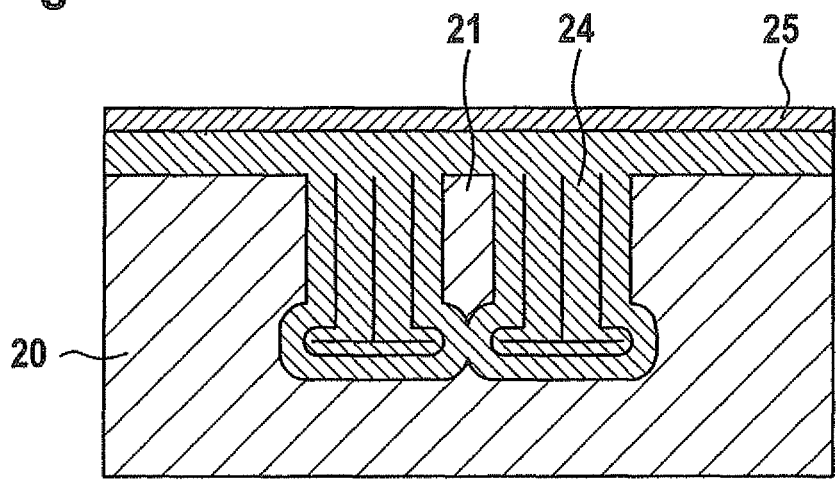

FIGS. 3a and 3b illustrate another possibility for filling cavity 27 in the area of trench 22, 23. To accelerate the filling process by thermal oxidation, polysilicon is deposited after the first oxidation step and also penetrates into cavity 27 through perforation 261 in trench mask 26. Accordingly, a polysilicon layer 29 is formed not only on trench mask 26 but also on first oxide layer 24 within cavity 27, as shown in FIG. 3a.

In a subsequent oxidation step, this polysilicon layer 29 is oxidized, as shown in FIG. 3b. Cavity 27 may be filled comparatively rapidly due to the material added by deposition of polysilicon.

Figure 4A:
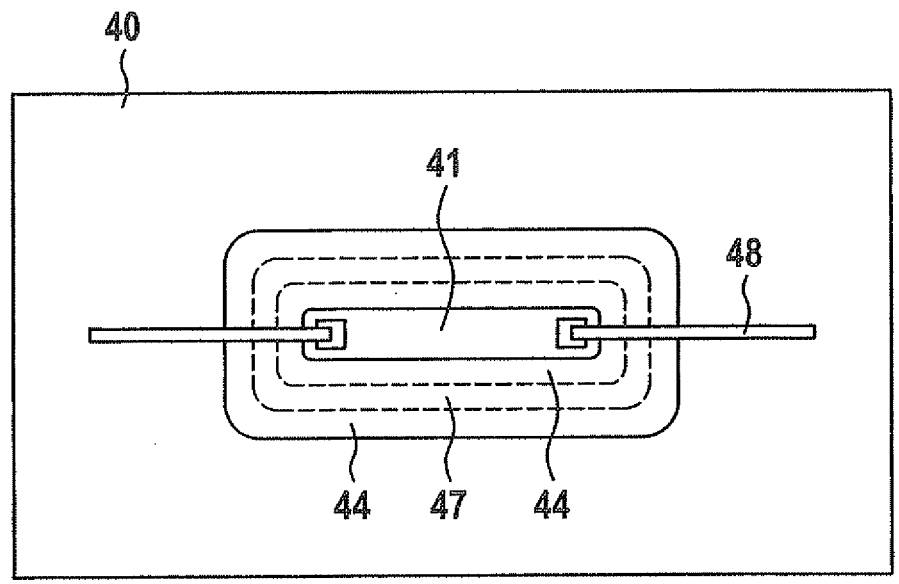
FIGS. 4a to 4c show three different resistor layouts.
Figure 4B:
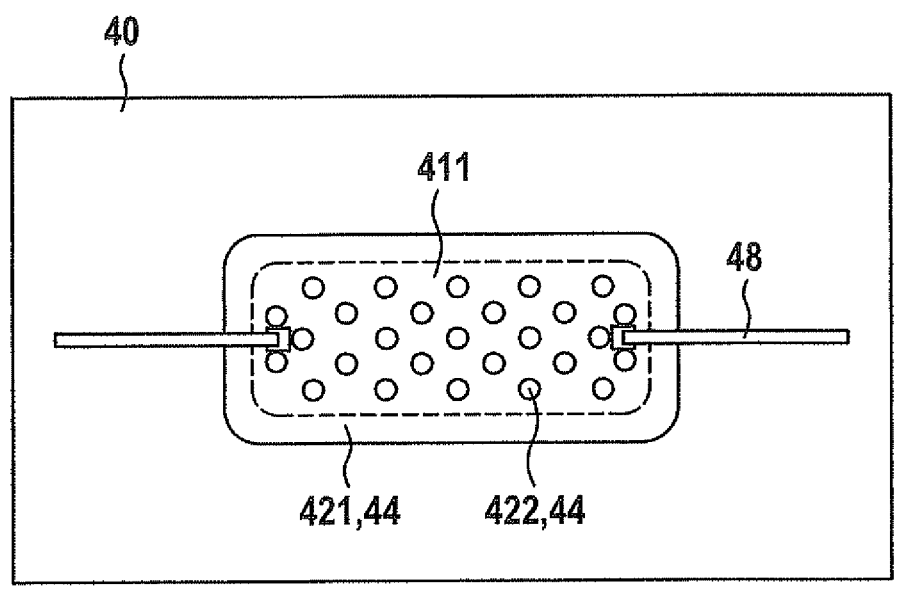
Figure 4C:
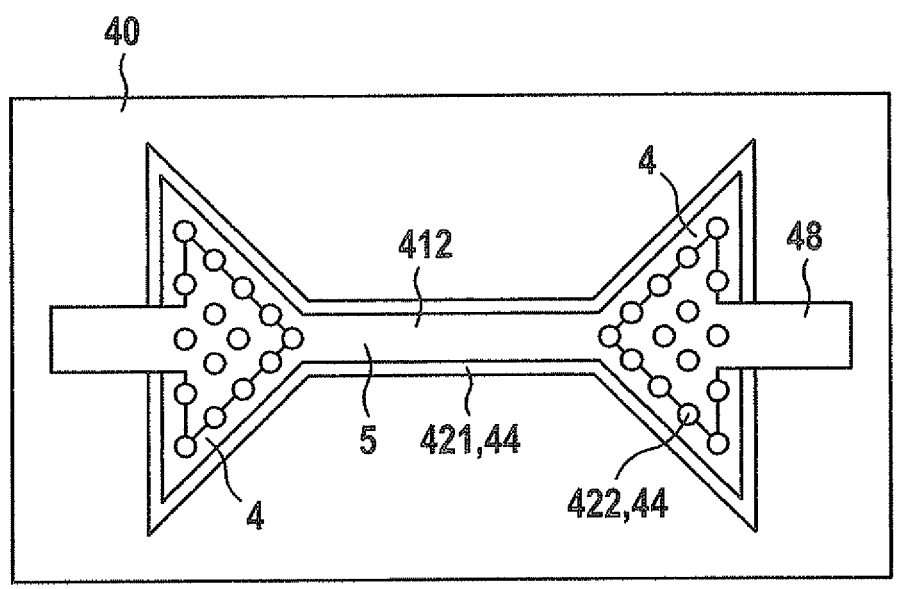

While FIGS. 1 through 3 show only sections through substrate 10 and 20 in a stage of the manufacturing process, FIGS. 4a through 4c show top views of a monocrystalline silicon substrate 40 illustrating various possible layouts for piezoresistors created in this way.

In the case of FIG. 4a, a piezoresistor 41 in the form of a relatively narrow doped area 41 resembling a section of a printed conductor is formed in the surface of substrate 40. The doping of resistance area 41 may be selected arbitrarily. In the case of a sensor element without any additional circuit elements, the substrate doping may be simply taken over. If a different doping is necessary, the entire substrate surface may easily be doped accordingly because resistance area 41 is sheathed completely by electrically insulating oxide 44 on the substrate side. This shows with dotted lines a residual cavity 47 beneath the closed surface in the area of the trench, which was created for lateral delineation of resistance area 41 and was filled with oxide 44. Piezoresistor 41 is contacted via two metal contacts 48, which are situated on opposite ends of resistance area 41.

In contrast with the variant shown in FIG. 4a, resistance area 411, which resembles a section of a printed conductor, is relatively wide in the case of FIG. 4b. Trench openings 422, which are situated in the form of a grid and are filled with electrically insulating oxide 44 in the same way as circumferential trench 421, are discernible within this cohesive resistance area 411. Resistance area 411 is undercut here by isotropic widening of the base area of circumferential trench 421 and also of trench openings 422. FIG. 4b illustrates that electrically insulated piezoresistors of an arbitrary lateral extent may be implemented according to the present invention by introducing trench openings within the cohesive resistance area.

FIG. 4c shows a piezoresistor 412 whose terminal areas 4 on the end are widened in the form of a wedge in comparison with central area 5. Grid-type trench openings 422 are formed here only inside these terminal areas 4, which are widened in the form of a wedge, these trench openings being filled with oxide 44 just like circumferential trench 421. Metal contacts 48 in the terminal areas of piezoresistor 412 are adapted to the wedge shape of terminal areas 4 and are also wedge-shaped.

This resistance layout having a widened restraint of the piezoresistor permits improved transmission and detection of surface stress. This has proven to be advantageous in diaphragm sensors, for example, because the surface stress here is to be detected with the aid of piezoresistors. The improved transmission of surface stress is based on the fact that the lateral compressive stress in the surroundings of the piezoresistor, which may be attributed to the different thermal expansion coefficients of the semiconductor material and the oxide, has the lesser effect on the surface stress in the area of the piezoresistor the wider its restraint is.

Figure 5:
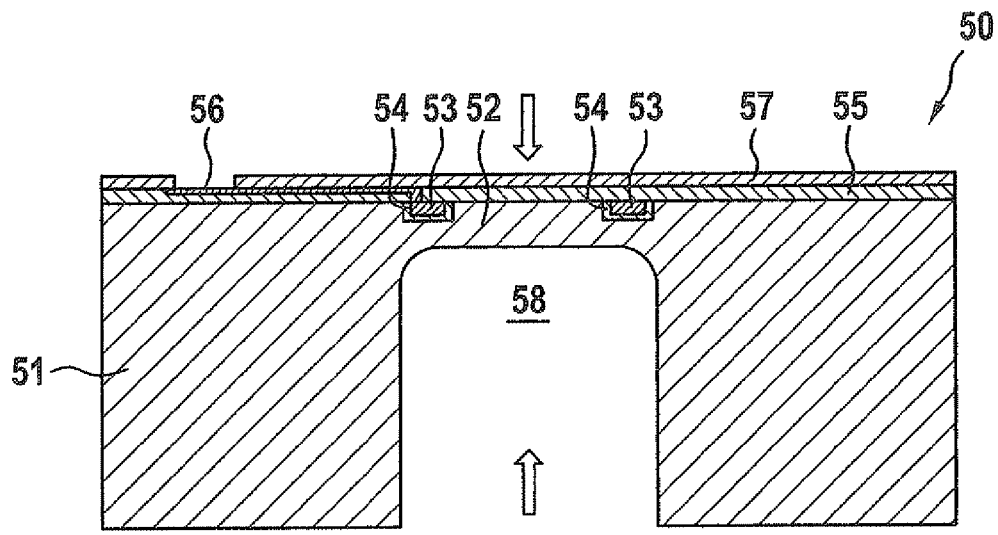
FIG. 5 shows a schematic sectional diagram through a first pressure sensor element 50
Figure 6:
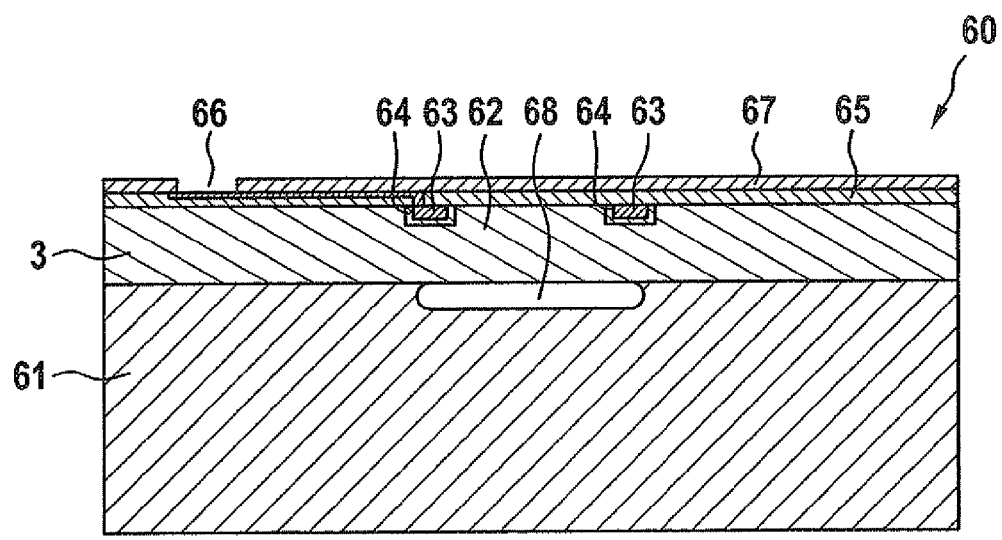
FIG. 6 shows a schematic sectional diagram through a second pressure sensor element 60.

As already mentioned at the outset, monocrystalline piezoresistors sheathed with an electrically insulating material and therefore electrically insulated from the adjacent substrate material are particularly suitable for signal detection with micromechanical pressure sensor elements which are to be used in the high-temperature range. For signal analysis, the piezoresistors may be connected in a Wheatstone bridge, for example. FIGS. 5 and 6 each illustrate such a pressure sensor element having monocrystalline piezoresistors in the diaphragm area.

Pressure sensor element 50 shown in FIG. 5 was implemented with arbitrary doping, starting from a silicon substrate 51. The doping required for the piezoresistors is advantageously selected as substrate doping. In any case, structured doping for the piezoresistors is not necessary here. The front side of substrate 51 was initially processed according to the method described above to create monocrystalline piezoresistors 53 in diaphragm area 52. Accordingly, piezoresistors 53 are adjacent to the substrate surface and embedded in an oxide area 54, so that they are insulated from substrate 51 laterally and downward. An oxide layer 55 having contact openings in the area of piezoresistors 53 is formed on the substrate surface. The connecting lines and terminal pads 56 for piezoresistors 53 are implemented here in a metallization applied to oxide layer 55 and extending over the contact openings. A passivation layer 57, which is open only in the area of terminal pads 56, forms the seal.

Only then was diaphragm 52 exposed starting from the back of substrate 51. A method known from bulk micromechanics such as anisotropic etching using KOH or TMAH or trenching was used for this purpose. Sensor element 51 shown here is used for differential pressure measurement because pressure is applied to diaphragm 52 on both sides, as indicated by arrows 1 and 2. If cavern 58 beneath diaphragm 52 is sealed under defined pressure conditions, for example, by hermetically sealed anodic bonding of glass on the back of sensor element 50, then sensor element 50 may also be used for absolute pressure measurement.

The bulk micromechanical methods may also be performed using an etch stop; for example, an SOI wafer on whose oxide layer the process is stopped may be used in trenching. A pn-etch stop may be used in KOH etching.

Only surface micromechanical methods were used to manufacture pressure sensor element 60 shown in FIG. 6. A diaphragm 62 was initially formed in a monocrystalline n-epitaxial layer 3 above a p-silicon substrate 61. Next, a cavern 68 was created in the p-silicon substrate beneath diaphragm 62. Only then was the method according to the present invention used to create monocrystalline piezoresistors 63 embedded in silicon oxide 64 in the diaphragm surface. Here again, piezoresistor 63 of pressure sensor element 60 is adjacent to the surface of monocrystalline n-epitaxial layer 3. An oxide layer 65 having contact openings in the area of piezoresistors 63 is formed on the surface of n-epitaxial layer 3. Connecting lines and terminal pads 66 for piezoresistors 63 are implemented in a metallization applied to oxide layer 65 and extending over the contact openings. A passivation layer 67, which is open only in the area of terminal pads 66, forms the seal.

What is claimed is:

1. A method for creating a piezoresistor in the surface of a semiconductor substrate, comprising:
    introducing at least one dopant into a selected surface area in the substrate to form a resistance area;
    undercutting the resistance area by etching such that the resistance area is laterally delineated by a circumferential, essentially vertical trench; and
    providing an electrically insulating layer on the resistance area, the wall and the base of the trench, such that the resistance area is electrically insulated from the adjacent semiconductor substrate material by the electrically insulating layer.

2. The method as recited in claim 1, wherein the circumferential trench is isotropically widened in a base area of the trench, such that at least a base portion of the resistance area is undercut by etching.

3. The method as recited in claim 2, wherein additional multiple trenches having a greater depth than the resistance area are provided within the resistance area, and wherein the additional multiple trenches are isotropically widened in the base area of the additional multiple trenches so that the resistance area is undercut by etching.

4. The method as recited in claim 1, wherein:
    the surface of the semiconductor substrate is provided with a trench mask having multiple perforations in a perforation area;
    the vertical trench is formed by etching via the perforations; and
    a distance between, and a size of, the multiple perforation openings are selected in such a way that the substrate, underneath the perforation area of the trench mask, is completely undercut by etching via the perforations.

5. The method as recited in claim 4, wherein the trench mask includes a structured oxide layer.

6. The method as recited in claim 1, wherein the electrically insulating layer is an oxide layer.

7. The method as recited in claim 4, wherein, subsequent to etching of the vertical trench, the vertical trench is at least partially filled to form a closed planar surface.

8. The method as recited in claim 6, wherein the electrically insulating layer further includes a polysilicon layer applied to the oxide layer, and wherein the polysilicon layer is oxidized.

9. The method as recited in claim 8, wherein the resistance area is electrically contacted with the aid of multiple metal contacts from the top.

10. The method as recited in claim 9, wherein two metal contacts are situated on two opposing end sections of the resistance area, and wherein the two opposing end sections of the resistance area are wider than the central area of the resistance area.

11. The method as recited in claim 1, further comprising:
    providing the piezoresistor in a micromechanical component that further includes at least one bendable structure element, wherein the piezoresistor is configured as a monocrystalline piezoresistor for signal detection.

12. The method as recited in claim 1, wherein:
    the circumferential trench is at an edge of the resistance area;
    the undercutting further includes:
        etching a plurality of trench openings within the resistance area;
        isotropically widening a base area of the circumferential trench for undercutting at least an outer edge region of the resistance area; and
        isotropically widening a base area of the trench openings; and
    the trench openings are deeper than portions of the resistance area undercut by the undercutting step.

13. The method as recited in claim 6, wherein the oxide layer is produced by thermal oxidation.

14. The method as recited in claim 6, wherein the oxide layer is produced by deposition.

15. A method for creating a piezoresistor in a surface of a semiconductor substrate, comprising:
    introducing at least one dopant into a selected surface area in the substrate to form a resistance area;
    etching a circumferential trench at an edge of a resistance area;
    etching a plurality of trenches within the resistance area;
    isotropically widening a base area of the circumferential trench, thereby undercutting at least an outer edge region of the resistance area;
    isotropically widening respective base areas of respective ones of the plurality of trenches, thereby undercutting respective portions of the resistance area that are adjacent respective ones of the plurality of trenches, wherein the plurality of trenches are deeper than the respective portions of the resistance area they undercut; and
    providing an electrically insulating layer on the resistance area, the wall of the circumferential trench, and the base of the circumferential trench, the resistance area thereby being electrically insulated from adjacent semiconductor substrate material.

16. The method as recited in claim 15, wherein the circumferential trench extends around a perimeter of the resistance area and the plurality of trenches.

17. The method as recited in claim 16, wherein the electrically insulating material is also provided on the bases and walls of the plurality of trenches.

18. The method as recited in claim 15, wherein the electrically insulating material is also provided on the bases and walls of the plurality of trenches.

* * * * *